(12) United States Patent
Anand et al.

(10) Patent No.: US 12,173,200 B2
(45) Date of Patent: Dec. 24, 2024

(54) REINFORCED LABEL ASSEMBLY

(71) Applicant: Avery Dennison Corporation, Mentor, OH (US)

(72) Inventors: Farminder Anand, Painesville, OH (US); Lauren Kalb, Painesville Township, OH (US)

(73) Assignee: Avery Dennison Corporation, Mentor, OH (US)

( * ) Notice: Subject to any disclaimer, the term of this patent is extended or adjusted under 35 U.S.C. 154(b) by 277 days.

(21) Appl. No.: 17/600,651

(22) PCT Filed: Apr. 2, 2020

(86) PCT No.: PCT/US2020/026324
§ 371 (c)(1),
(2) Date: Oct. 1, 2021

(87) PCT Pub. No.: WO2020/206073
PCT Pub. Date: Oct. 8, 2020

(65) Prior Publication Data
US 2022/0195252 A1    Jun. 23, 2022

Related U.S. Application Data

(60) Provisional application No. 62/829,170, filed on Apr. 4, 2019.

(51) Int. Cl.
*C09J 7/29* (2018.01)
*C09J 7/21* (2018.01)
*C09J 7/35* (2018.01)

(52) U.S. Cl.
CPC . *C09J 7/29* (2018.01); *C09J 7/21* (2018.01); *C09J 7/35* (2018.01); *C09J 2203/334* (2013.01);
(Continued)

(58) Field of Classification Search
CPC ......... C09J 7/29; C09J 7/21; C09J 7/35; C09J 2203/334; C09J 2301/304; C09J 2400/283;
(Continued)

(56) References Cited

U.S. PATENT DOCUMENTS 5,162,150 A * 11/1992 Buis ................. B32B 5/022
428/110
5,494,745 A   2/1996 Vander Velden et al.
(Continued)

FOREIGN PATENT DOCUMENTS

CN    201366112    12/2009
CN    103460266    12/2013
(Continued)

OTHER PUBLICATIONS

Machine translation of WO 2017/002634 A1 (Year: 2023).*
(Continued)

*Primary Examiner* — Scott R. Walshon

(57) ABSTRACT

A label assembly includes a label print layer with enhanced tensile, tear, and/or stiffness properties. The enhanced property or properties may be achieved by including a reinforcement layer, including a reinforcement material in the adhesive layer, and/or modifying the facestock layer.

19 Claims, 8 Drawing Sheets

(52) U.S. Cl.
CPC .... *C09J 2301/304* (2020.08); *C09J 2400/283* (2013.01); *C09J 2429/006* (2013.01)

(58) Field of Classification Search
CPC ............ C09J 2429/006; C09J 2429/001; C09J 2429/003
See application file for complete search history.

(56) References Cited

U.S. PATENT DOCUMENTS

| | | | |
|---|---|---|---|
| 5,882,573 | A | 3/1999 | Kwok et al. |
| 5,902,540 | A | 5/1999 | Kwok |
| 5,904,298 | A | 5/1999 | Kwok et al. |
| 5,925,432 | A | 7/1999 | Kian et al. |
| 6,117,509 | A | 9/2000 | Lee |
| 6,357,941 | B1 | 3/2002 | Amano et al. |
| 7,020,926 | B2 * | 4/2006 | Mckay .................. A47L 25/005 15/105 |
| 7,316,839 | B2 | 1/2008 | Knauf |
| 7,883,748 | B2 | 2/2011 | Hasegawa et al. |
| 9,702,088 | B2 * | 7/2017 | White .................. D21H 25/005 |
| 10,377,117 | B2 * | 8/2019 | Dubey ...................... B32B 7/12 |
| 11,447,672 | B2 * | 9/2022 | Milliman ................ C08L 53/02 |
| 2003/0039772 | A1 | 2/2003 | Takeyama et al. |
| 2004/0038026 | A1 | 2/2004 | Li et al. |
| 2005/0112370 | A1 | 5/2005 | Wang |
| 2007/0269626 | A1 * | 11/2007 | Rueckert ............... A47L 25/005 428/40.1 |
| 2009/0243141 | A1 * | 10/2009 | Goda ........................ D01F 6/62 264/168 |
| 2011/0084213 | A1 | 4/2011 | Boudouris et al. |
| 2013/0251944 | A1 | 9/2013 | Kian et al. |
| 2014/0008441 | A1 | 1/2014 | Huynh |
| 2017/0044406 | A1 | 2/2017 | Hubbard et al. |

FOREIGN PATENT DOCUMENTS

| | | | |
|---|---|---|---|
| CN | 203931363 U | 11/2014 | |
| CN | 204475047 U | 7/2015 | |
| CN | 205384819 U | 7/2016 | |
| CN | 107011822 | 8/2017 | |
| CN | 206579234 U | 10/2017 | |
| CN | 207391331 U | 5/2018 | |
| JP | 10-268776 | 10/1998 | |
| JP | 2015096601 A * | 5/2015 | |
| KR | 10-2005-0079416 | 8/2008 | |
| TH | 53472 | 10/2002 | |
| WO | 96/21557 | 7/1996 | |
| WO | 2006/076116 | 7/2006 | |
| WO | WO-2017002634 A1 * | 1/2017 | ............. B32B 27/00 |

OTHER PUBLICATIONS

Machine translation of JP 2015-096601 A (Year: 2023).*
EY Technologies, "Reinforced Polyamide Adhesives," http://www.eytechnologies.com/reinforced_polyamide.html, as least as early as Mar. 2, 2018, 1 page.
University Products, "High Tack ATG Tape," https://www.universityproducts.com/high-tack-atg-tape.html, at least as early as Mar. 2, 2018, 2 pages.
"Reinforced Pressure Sensitive Adhesive Tape," http://www.adhesives.org/docs/default-document-library/reinforcedpdf.jpg?sfvrsn=1ee2774f_0, as least as early as Mar. 2, 2018, 1 page.
International Preliminary Report on Patentability dated Sep. 28, 2021 issued in corresponding IA No. PCT/US2020/026324 filed Apr. 2, 2020.
International Search Report and Written Opinion dated Jul. 21, 2020 issued in corresponding IA No. PCT/US2020/026324 filed Apr. 2, 2020.

* cited by examiner

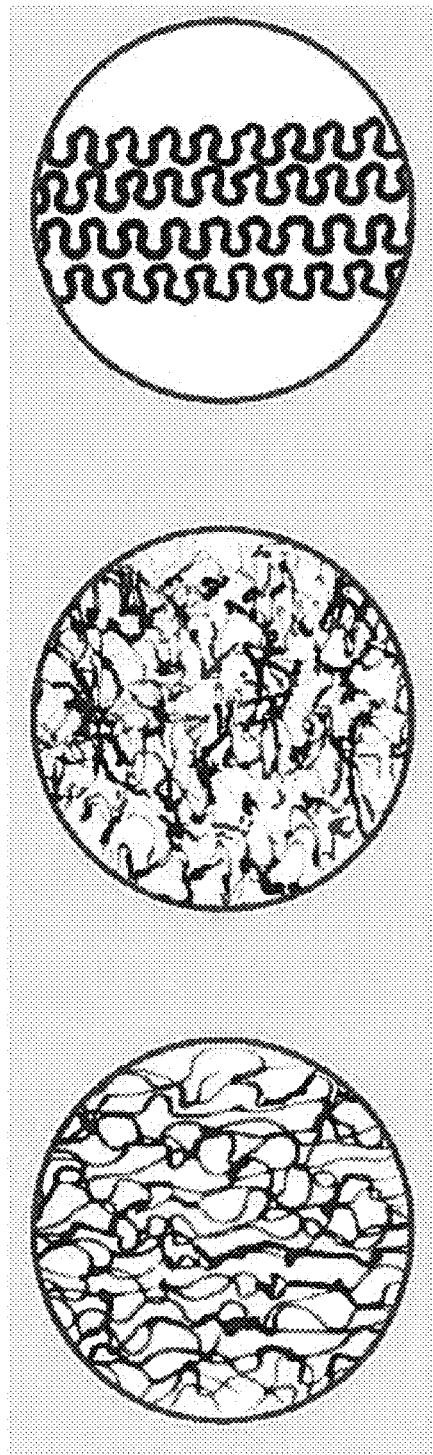
FIG. 5
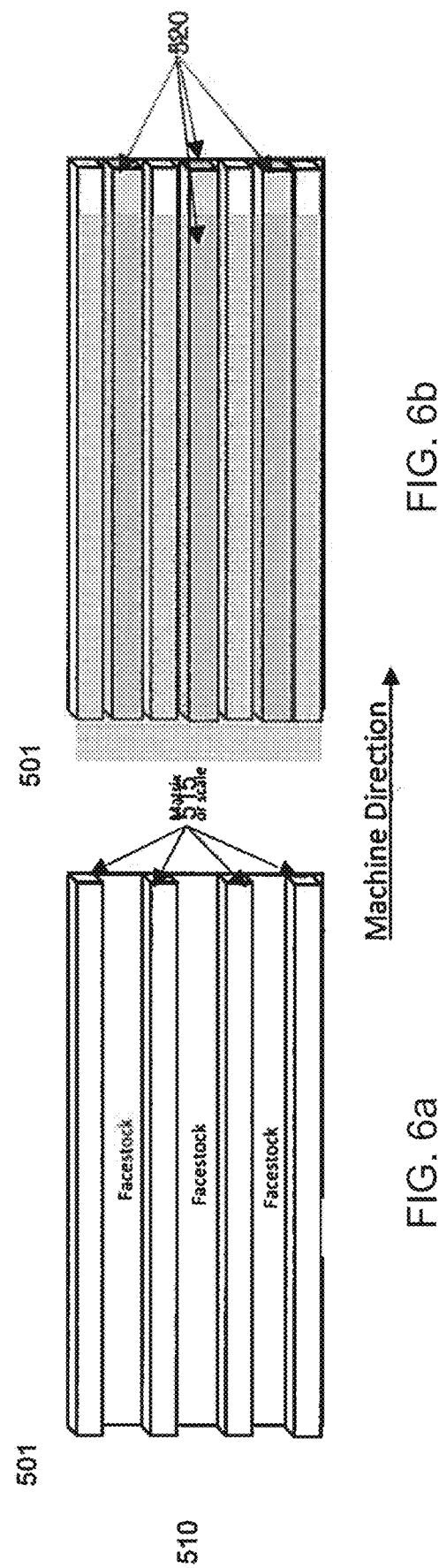
FIG. 6a
FIG. 6b

REINFORCED LABEL ASSEMBLY

CROSS-REFERENCE TO RELATED APPLICATIONS

The present application is a 371 of International Application No. PCT/US2020/026324, which was published in English on Oct. 8, 2020, and claims the benefit of U.S. Provisional Patent Application No. 62/829,170 filed Apr. 4, 2019, both of which are incorporated herein by reference in their entireties.

FIELD

The present subject matter relates to reinforced label assemblies having enhanced tensile strength, tear strength, stiffness properties, and/or converting speeds, and methods of making and using thereof.

BACKGROUND

In label manufacturing, the four major raw material costs are facestock, liner, adhesive, and release chemistry. In many applications, it would be desirable to reduce the thickness of the facestock in order to reduce manufacturing costs. However, facestock basis weight reduction can lead to a loss in tensile strength, tear strength, and/or stiffness. Reductions in facestock tensile strength and tear strength can lead to increased web breaks during lamination (i.e., when the layers of the label are put together) and matrix stripping while reductions in stiffness may lead to wrinkles in the facestock making label dispensability challenging. If the liner is removed from the label assembly, as in linerless label assemblies, additional stiffness and strength may be required from the facestock/adhesive combination. Moreover, the challenge with changing any component in a pressure-sensitive laminate construction is the impact on converting speeds. In particular, the use of thinner facestocks may negatively impact converting speeds.

A need remains for label assemblies having a beneficial combination of properties (i.e., enhanced tensile, tear, and/or stiffness) which can be manufactured at a lower cost and in a more sustainable manner (e.g., use of less material).

SUMMARY

Reinforced label assemblies which exhibit enhanced tensile strength, tear strength, stiffness, and/or converting speed and methods of making and using are described herein. In some embodiments, the reinforced label assemblies contain at least a facestock, at least one adhesive layer, and a means for reinforcing the label assembly. The label assembly may include a release liner. However, in some embodiments the label assembly is linerless. The enhanced property or properties may be achieved by (1) including a reinforcement layer in the label assembly, (2) including a reinforcement material in the adhesive layer, and/or (3) modifying the facestock layer. In some embodiments, only one of (1), (2), and (3) is utilized. In other embodiments, all three of (1), (2), and (3) are utilized. In further embodiments, two of (1), (2), and (3) are utilized.

In some embodiments, the adhesive layer contains a pressure sensitive adhesive including, but not limited to, at least one of a hot melt adhesive, an emulsion adhesive, and a solvent adhesive. Non-limiting examples of hot melt adhesives include ethylene-vinyl acetate copolymers, polyolefins, polyamides, polyesters, polyurethanes, styrene block copolymers, polycaprolactone, polycarbonate, fluoropolymers, silicone rubbers, and thermoplastic elastomers. Non-limiting examples of emulsion adhesive materials include polyvinyl acetate, ethylene-vinyl acetate, other acrylics, and styrene-butadiene latexes. Solvent-based adhesives include an adhesive material in a solvent. In some embodiments, the solvent is water-based or is an organic solvent. In some embodiments, the adhesive material may be an acrylic material or a urethane-based material. In some embodiments, the constructions can contain, alone or in addition to the PSA, a permanent or pressure-sensitive to structural adhesive.

In some embodiments, the means for reinforcing the label assembly is a reinforcement layer. In some embodiments, the reinforcement layer is located between the facestock layer and the adhesive layer. The reinforcement layer can be a continuous layer or a discontinuous layer, such as a matrix or patterned structure. The term "discontinuous", as used herein, means (1) areas of adhesive and no adhesive or (2) areas of more adhesive and less adhesive (i.e., thinner layer). In some embodiments, the reinforcement layer is continuous. In some embodiments, the reinforcement layer is discontinuous or patterned, for example, a random or ordered pattern. The pattern can involve area of adhesive and no adhesive or areas of more adhesive and less adhesive. In some embodiments, the reinforcement layer includes a plurality of gaps or openings and the adhesive layer extends into the gaps or openings to contact the facestock layer. In some embodiments, the reinforcement layer may include a plurality of rows of a reinforcement material. The rows may be aligned in the machine direction of the label assembly. Alternatively, the rows may be aligned in the cross direction. The alignment of the rows for a particular application may depend on the converting and dispensing needs. In other embodiments, the means for reinforcing the label assembly is a reinforcement material or reinforcing material incorporated into the one or more adhesive layers.

The reinforcement material may include at least one material selected from stiff permanent adhesives; high glass transition temperature (e.g., greater than 20° C., 25° C., 30° C., 35° C., 40° C., 45° C., 50° C., 55° C., 60° C., 65° C., or 70° C.) polymers with high strength (e.g., tensile strength greater than or equal to 15 mPa) and/or stiffness (e.g., flexural modulus greater than or equal to 0.3); permanent adhesives; permanent adhesives mixed with fibers or microfibers; starch, alone or mixed with dried crushed leaves, fibers, or microfibers; saw dust; dried crushed leaves; polyvinyl alcohol (PVOH) alone or mixed with microfiber; polyamidoamine-epichlorohydrin ("PAE"); and PAE mixed with PVOH. In some embodiments, the reinforcement material contains a mixture of polyamidoamine-epichlorohydrin and polyvinyl alcohol.

The facestock layer may have a basis weight in the range of from about 12 pounds per ream to about 780 pounds per ream, from about 12 pounds per ream to about 400 pounds per ream, from about 12 pounds per ream to about 150 pounds per ream, from about 12 pounds per ream to about 120 pounds per ream, from about 12 pounds per ream to about 100 pounds per ream, from about 12 pounds per ream to about 80 pounds per ream, from about 12 pounds per ream to about 60 pounds per ream, from about 20 pounds per ream to about 50 pounds per ream, or from about 30 pounds per ream to about 44 pounds per ream.

Methods for forming a label assembly are also described herein. In some embodiments, the method includes applying a reinforcement layer to a facestock layer and applying an adhesive layer to the reinforcement layer. In some embodiments, the application of the reinforcement layer to the facestock layer may include pattern coating a reinforcement material onto a first surface of the facestock layer, wherein the reinforcement layer covers less than 100% of the first surface. In some embodiments, the reinforcement layer includes a plurality of openings. In some embodiments, the application of the adhesive layer to the reinforcement layer includes depositing an adhesive composition on the reinforcement layer and the adhesive composition at least partially fills the plurality of openings. In other embodiments, the adhesive layer is applied to the reinforcement layer, the adhesive layer-reinforcement layer laminate is applied to a liner, and the adhesive layer-reinforcement layer-liner construction is applied or laminated to the facestock.

These and other non-limiting aspects of the present disclosure are discussed further herein.

BRIEF DESCRIPTION OF THE DRAWINGS

The following is a brief description of the drawings, which are presented for the purposes of illustrating the exemplary embodiments disclosed herein and not for the purpose of limiting the same.

FIG. 5 illustrates three exemplary patterns which may be used in the reinforcement layer of an adhesive label assembly.

FIGS. 6a and b illustrate exemplary label precursors before and after an adhesive composition is applied to a facestock.

DETAILED DESCRIPTION

Figure 1:
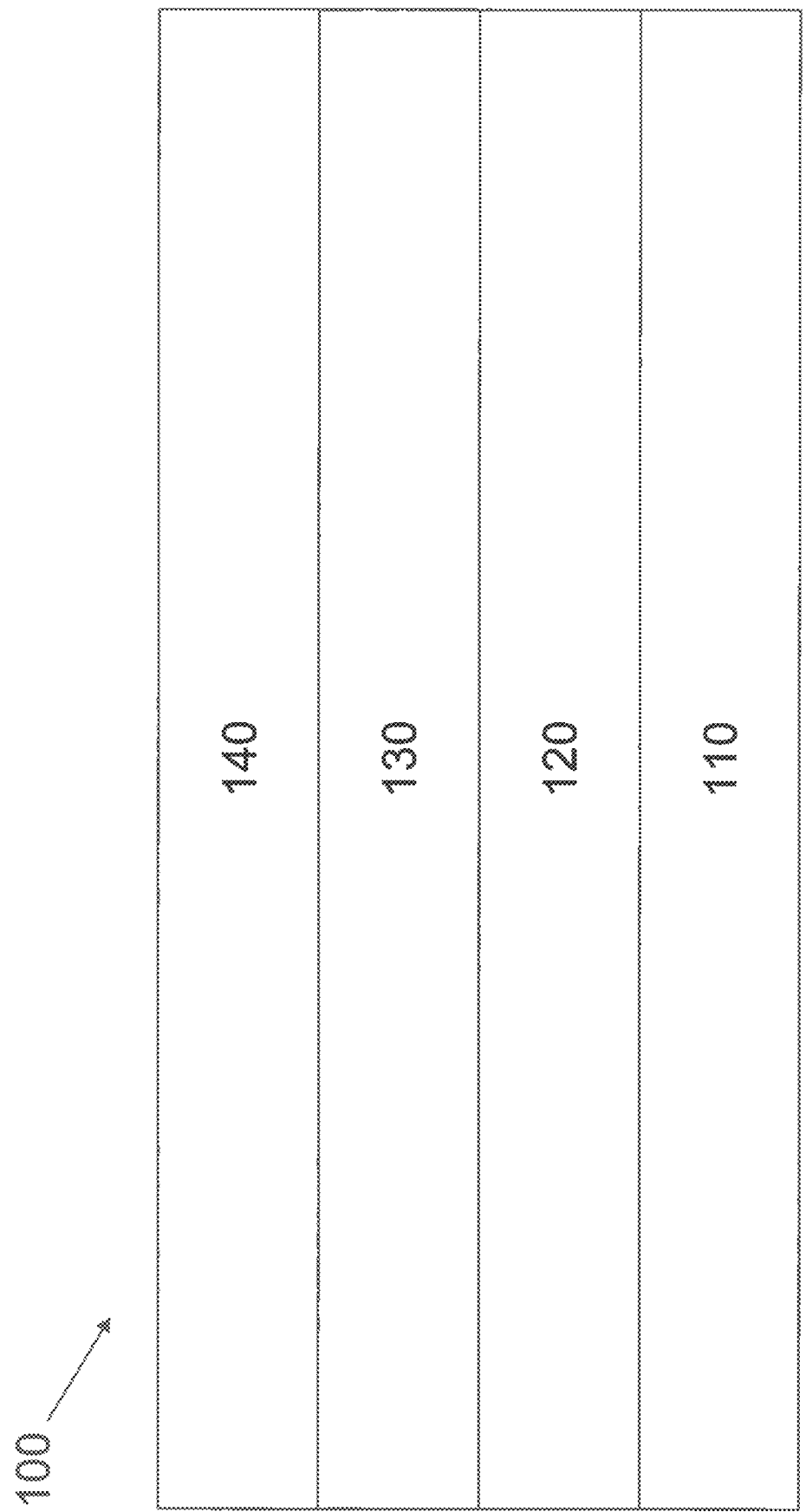
FIG. 1 is a cross-sectional view of an adhesive label assembly.

The present disclosure may be understood more readily by reference to the following detailed description of desired embodiments included therein. In the following specification and the claims which follow, reference will be made to a number of terms which shall be defined to have the following meanings.

I. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the term "label print layer" refers to the portion of a label assembly that is applied on a product.

As used herein, the term "label liner layer" refers to the release chemistry and the liner part of the label assembly.

As used herein, the term "reinforcement layer" means continuous or non-continuous (e.g., discontinuous) layer that provides improvement in label print layer tensile strength, tear strength, stiffness, and/or converting speed.

II. Label Assemblies

Label assemblies which exhibit enhanced tensile strength, tear strength, stiffness properties, and/or converting speed are described herein. The enhanced property or properties may be achieved by (1) including a reinforcement layer, (2) including a reinforcement material in the adhesive layer, and/or (3) modifying the facestock layer. In some embodiments, only one of (1), (2), and (3) is utilized. In other embodiments, all three of (1), (2), and (3) are utilized. In further embodiments, two of (1), (2), and (3) are utilized. All combinations are disclosed herein.

The label assemblies generally include at least a facestock layer, at least one adhesive layer, and a means for reinforcing the label assembly. In some embodiments, the label assembly contains a reinforcement layer between the facestock and the adhesive layers and/or a release liner on the side of the adhesive layer opposite the facestock. The various layers and their compositions are discussed in more detail below.

The label assemblies described herein include, but are not limited to, direct thermal label assemblies, thermal transfer label assemblies, prime label assemblies, inkjet label assemblies, laser label assemblies, EDP assemblies, and combinations thereof.

Methods for forming the label assemblies and labeling articles with the assemblies are also disclosed. Rolls of labels are also disclosed. The rolls may include a single row of labels of a plurality of rows of labels. Containers labeled with the label assemblies are also disclosed.

A. Reinforcement Layer

In some embodiments, the label assemblies described herein include a reinforcement layer containing a uniform or a matrix structure of a strong and stiff material between the facestock and the adhesive. Such a reinforcement layer has the potential to (i) increase the overall stiffness of the label print layer at dispensing; and (ii) increase the tensile and tear strength of the label print layer during the die-cutting and matrix stripping steps.

FIG. 1 is a cross-sectional view of a conventional adhesive label assembly 100, without a reinforcement layer or reinforcement material, including, in sequence, a facestock layer 110, an adhesive layer 120, release chemistry 130, and a liner 140.

Figure 2:
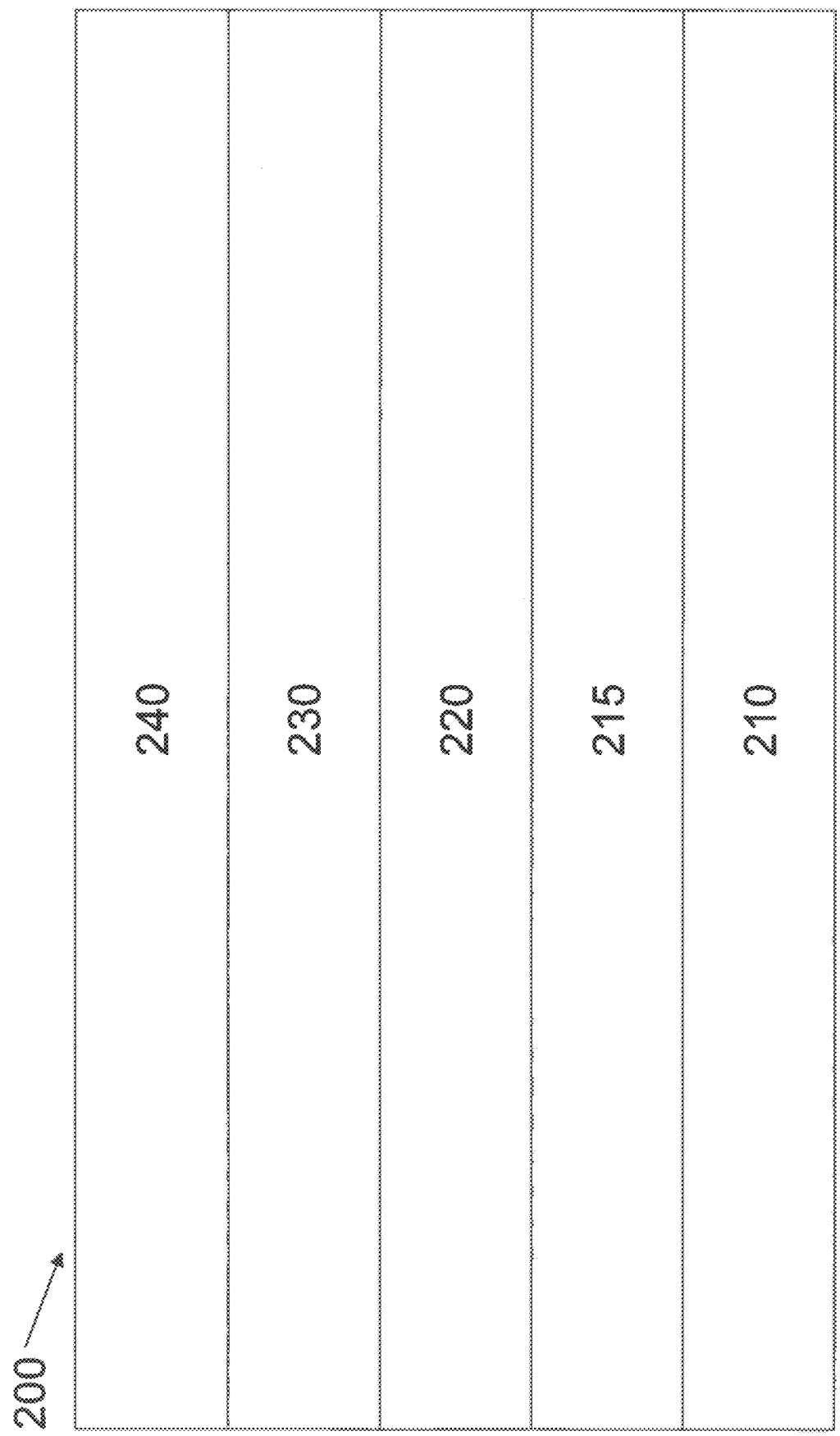
FIG. 2 is a cross-sectional view of an exemplary adhesive label assembly.

FIG. 2 illustrates a cross-sectional view of an exemplary label assembly 200 in accordance with some embodiments of the present disclosure. The label assembly 200 includes a facestock layer 210, a reinforcement layer 215, an adhesive layer 220, release chemistry 230, and a liner 240. The depicted embodiment includes a uniform reinforcement layer 215. However, in some embodiments, the reinforcement layer 215 is not uniform. Furthermore, the release liner may be omitted in linerless embodiments.

Figure 3:
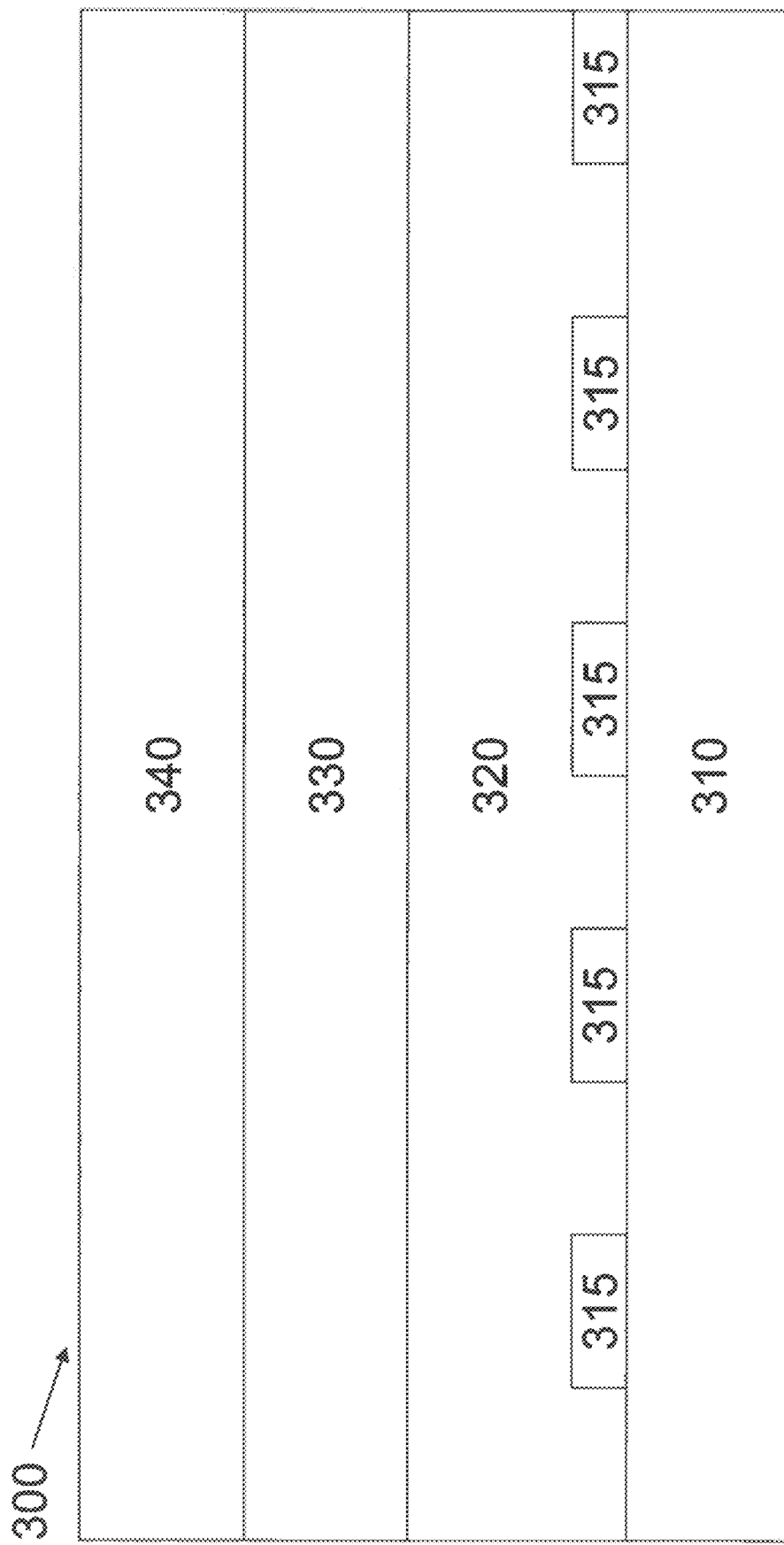
FIG. 3 is a cross-sectional view of an exemplary adhesive label assembly.

Since the stiffness of a material is proportional to the cube of its thickness, a matrix or patterned structure may provide higher overall stiffness compared to a uniform layer containing the same amount of the reinforcement composition. FIG. 3 illustrates a cross-sectional view of an exemplary label assembly 300 in accordance with some embodiments of the present disclosure. The label assembly 300 includes a facestock layer 310, a reinforcement layer 315, an adhesive layer 320, release chemistry 330, and a liner 340. The depicted reinforcement layer 315 differs from the reinforcement layer 215 of the label assembly 200 of FIG. 2 because the reinforcement layer 315 in FIG. 3 is not uniform. In particular, the reinforcement layer 315 includes pores or openings. Adhesive material fills these openings such that a portion of the adhesive layer 320 contacts the facestock 310.

Figure 4:
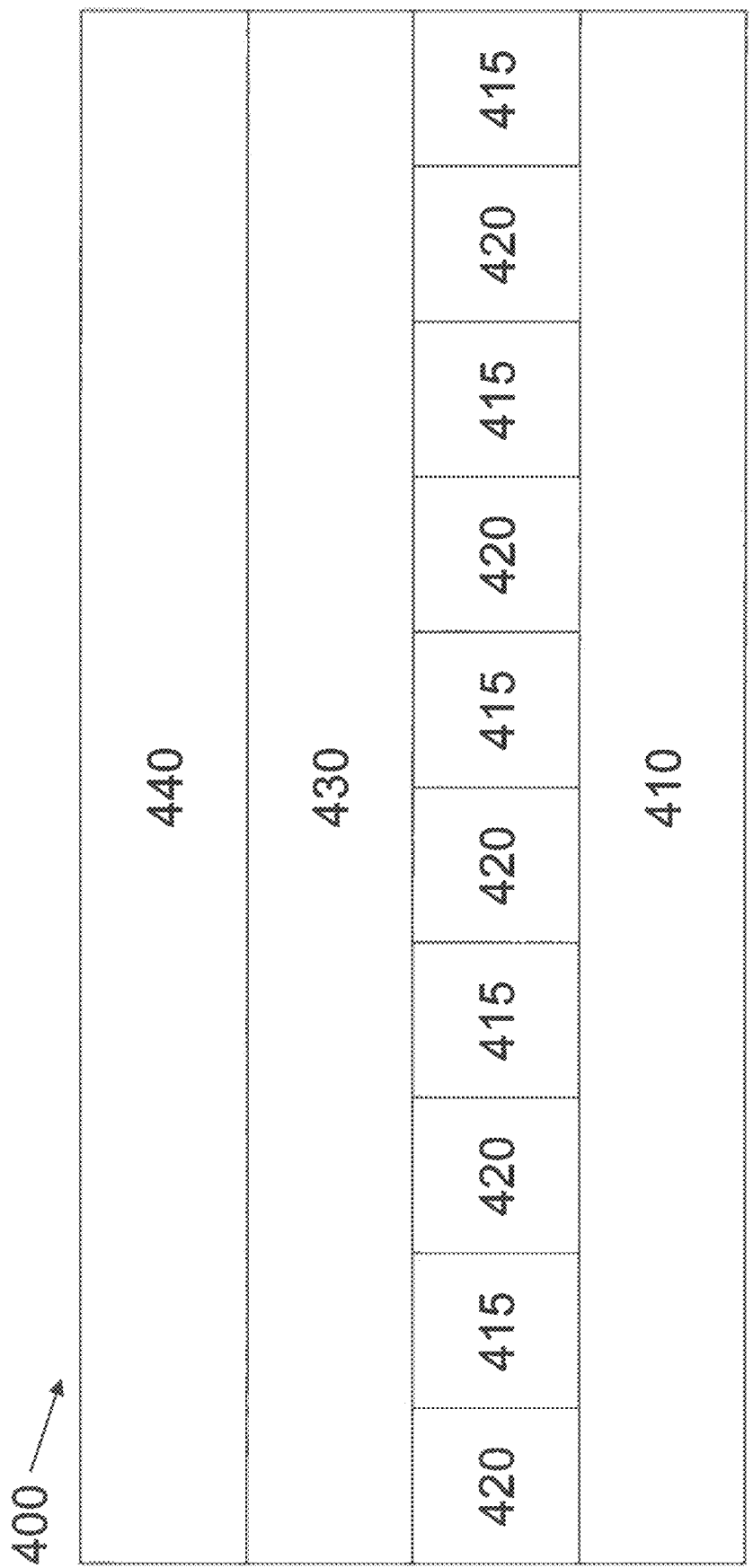
FIG. 4 is a cross-sectional view of an exemplary label assembly.

FIG. 4 is a cross-section view of an exemplary label assembly 400 with a non-uniform reinforcement layer 415. In some embodiments, the reinforcement material 415 and the adhesive 420 are located in the same layer wherein the adhesive 420 is interspersed in openings in the reinforcement material 415 and vice versa. In some embodiments, the reinforcement material contacts portions of the release chemistry 430.

The selection of the reinforcement material is based on several factors including cost, the balance of properties, not negatively impacting die cutting or causing die wear, not significantly impacting print quality, and not negatively impacting overall adhesion. It may also be beneficial to reduce label weight and/or thickness relative to currently available labels. The balance of properties includes tensile strength, tear strength, and/or stiffness. In some embodiments, only tensile strength and tear strength are enhanced. In other embodiments, only stiffness is enhanced. In further embodiments, all of these properties are enhanced by including the reinforcement material or only one of them is enhanced.

Non-limiting examples of reinforcement materials include: stiff permanent adhesives; high glass transition temperature (e.g., greater than 20° C., 25° C., 30° C., 35° C., 40° C., 45° C., 50° C., 55° C., 60° C., 65° C., or 70° C.) polymers with high strength (e.g., tensile strength greater than or equal to 15 mPa) and/or stiffness (e.g., flexural modulus greater than or equal to 0.3); permanent adhesives, alone or mixed with fibers or microfibers; starch, alone or mixed with dried crushed leaves and/or fiber or microfibers; saw dust; dried crushed leaves; polyvinyl alcohol; polyamidoamine-epichlorohydrin; and mixtures of two or more of any of these materials.

Exemplary permanent adhesives include, but are not limited to, acrylate, epoxy, and plastic polymer-based adhesives.

Exemplary fibers or microfibers include, but are not limited to, carbon fibers.

In some embodiments, the reinforcement composition includes a mixture or blend of polyvinyl alcohol and polyamidoamine-epichlorohydrin.

The reinforcement and adhesive compositions may be applied as a dual layer coating. In the coating, the reinforcement layer may be a uniform reinforcement layer or a patterned reinforcement layer.

In some embodiments, the reinforcement layer is produced on the facestock via patterned coating (e.g., spray coating) to create a matrix structure followed by coating (e.g., flood coating or spray coating) of the adhesive composition (e.g., pressure-sensitive adhesive composition).

Spray coating can be done using a variety of techniques and equipment known in the art. In some embodiments, the spray coating may be performed using a UFD™ fiberized spray applicator supplied by ITW Dynatec. A further discussion of fiberized spray applicators is provided in U.S. Pat. Nos. 5,882,573, 5,902,540, and 5,904,298, the contents of which are incorporated by reference herein.

FIG. 5 illustrates three non-limiting patterns for use when the reinforcement layer is patterned. These patterns include two random fiber patterns and an omega pattern. These random and omega patterns can provide improved attributes in both the machine and cross directions. The dimensions of the patterns can be optimized to selectively optimize the tensile, tear, and stiffness properties in both directions.

The inclusion of a matrix or scale of a strong and stiff material between the facestock and the adhesive has the potential to (1) increase the overall stiffness of the label print layer at dispensing; and/or (2) increase the tensile and tear strength of the label print layer during die-cutting and matrix stripping.

FIGS. 6a and 6b, respectively, illustrate label precursors 501 before and after the adhesive is provided. As shown in FIG. 6a, the matrix or scale of reinforcing material 515 has been provided in rows or bars aligned with the machine direction. The facestock 510 is partially exposed through openings between the rows of reinforcing material 515. As shown in FIG. 6b, the adhesive 520 is applied in these openings between the rows of reinforcing material and above the reinforcing material. Although the bars of reinforcing material 515 are aligned with the machine direction in FIGS. 6a and 6b, the bars may alternatively be aligned with the cross direction in other embodiments. The bars may also be offset from the machine direction or the cross direction by an angle in some embodiments. Further embodiments may employ a grid structure for the reinforcement material. The grid structure may include a first plurality of rows parallel to the machine direction and a second set of rows parallel to the cross direction. In other embodiments, the grid structure is offset from the machine and cross directions.

In some embodiments, enhanced machine direction stiffness, enhanced machine direction tensile strength, and enhanced cross direction tear strength are desired. To achieve this combination of properties, bars of the reinforcement material may be provided in alignment with the machine direction.

Machine direction tensile strength and cross direction tear strength may be more important in the initial stages whereas cross direction tensile strength and machine direction tear strength may be more important in the later stages. Therefore, a lighter facestock with higher machine direction tensile strength and higher cross direction tear strength can be used and then a random or non-random (e.g., omega) pattern of the reinforcing material can be applied to selectively enhance cross direction tensile strength, machine direction tear strength, and stiffness.

In patterned configurations, the reinforcement material may cover from about 0.01% to about 99.9% of the surface area of one surface of the facestock, including at least about 0.1%, at least about 1%, at least about 5%, at least about 10%, at least about 20%, at least about 30%, at least about 40%, at least about 50%, at least about 60%, at least about 70%, at least about 80%, and at least about 90% of the surface. The reinforcement material may cover at most about 99%, at most about 95%, at most about 90%, at most about 80%, at most about 70%, at most about 60%, at most about 50%, at most about 40%, at most about 30%, at most about 20%, or at most about 10% of the surface. All combinations of these upper and lower limits are contemplated and disclosed herein.

B. Adhesive Layer

The adhesive layer may contain a pressure-sensitive adhesive composition or an activatable adhesive composition. In some embodiments, the adhesive composition includes at least one of a hot melt adhesive, an emulsion adhesive, and/or a solvent adhesive.

Hot melt adhesives are typically deposited in molten form. Non-limiting examples of hot melt adhesives include ethylene-vinyl acetate copolymers, polyolefins, polyamides, polyesters, polyurethanes, styrene block copolymers, polycaprolactone, polycarbonate, fluoropolymers, silicone rubbers, and thermoplastic elastomers.

Non-limiting examples of emulsion adhesive materials include polyvinyl acetate, ethylene-vinyl acetate, other acrylics, and styrene-butadiene latexes.

Solvent-based adhesives include an adhesive material in a solvent. In some embodiments, the solvent is water-based or is an organic solvent. The adhesive material may be an acrylic material or a urethane-based material in some embodiments.

In some embodiments, the adhesive composition includes a reinforcing material. The reinforcing material in the adhesive layer may be selected from the reinforcing materials discussed above with respect to the reinforcing layer.

Non-limiting examples of materials that may be mixed with the adhesive include high glass transition temperature polymers (e.g., greater than 20° C., 25° C., 30° C., 35° C., 40° C., 45° C., 50° C., 55° C., 60° C., 65° C., or 70° C.), sawdust, glass fibers, and carbon fibers.

The inclusion of reinforcing material in the adhesive may increase the overall stiffness, tensile strength, and/or tear strength of the adhesive layer and the overall stiffness of the label assembly.

The adhesive may include one or more additives. Non-limiting examples of additives include tackifying resins, waxes, plasticizers, antioxidants, stabilizers (including UV stabilizers), pigments, biocides, flame retardants, antistatic agents, and fillers.

In some embodiments, opacifying agents are incorporated into the adhesive layer.

C. Facestock Layer

The facestock layer may be a monolayer structure or a multilayer structure.

The facestock material may be selected from materials including, not limited to, a papers (cellulose-based or syntetic), films (e.g., a polymer film material), foils (e.g., metal or metallic foils), or combinations thereof. Exemplary film facestocks include, but are not limited to, acetates, such as polyvinyl acetates and cellulose acetates; polyesters, such as polyethylene terephthalate; polyolefins (e.g., polyethylene and polypropylene); vinyl materials, such as polyvinyl chloride; other polymeric materials, and combinations thereof.

In some embodiments, the label assemblies include a modified facestock layer. The basis weights (measured in pounds per 3300 ft$^2$, i.e. #/ream) may vary depending on the particular application. Different categories of facestocks can have different basis weights and caliper measurements. In some embodiments, the basis weight of the facestock is in the range of from about 12 #/ream to about 120 #/ream, from about 12 #/ream to about 60 #/ream, or from about 12 #/ream to about 44 #/ream. For example, facestocks for the laser product category may have basis weights in the range of about 48 to about 50 #/ream. For the semigloss product category, the lowest known basis weight is 40 #/ream but is associated with a loss of converting speed.

The facestocks may have modified tensile/tear strength balance to (1) produce lower basis weight/thinner (e.g., 30 #/ream to 120 #/ream) facestocks without significant converting speed loss; and (2) improve the converting speeds of current facestocks by maintaining the desired balance of properties.

Facestock manufacturers believe that the cross direction tensile strength of the facestock plays a critical role in the converting speed. However, simulations show that both cross direction tensile strength and machine direction tear strength play important roles.

Figure 7:
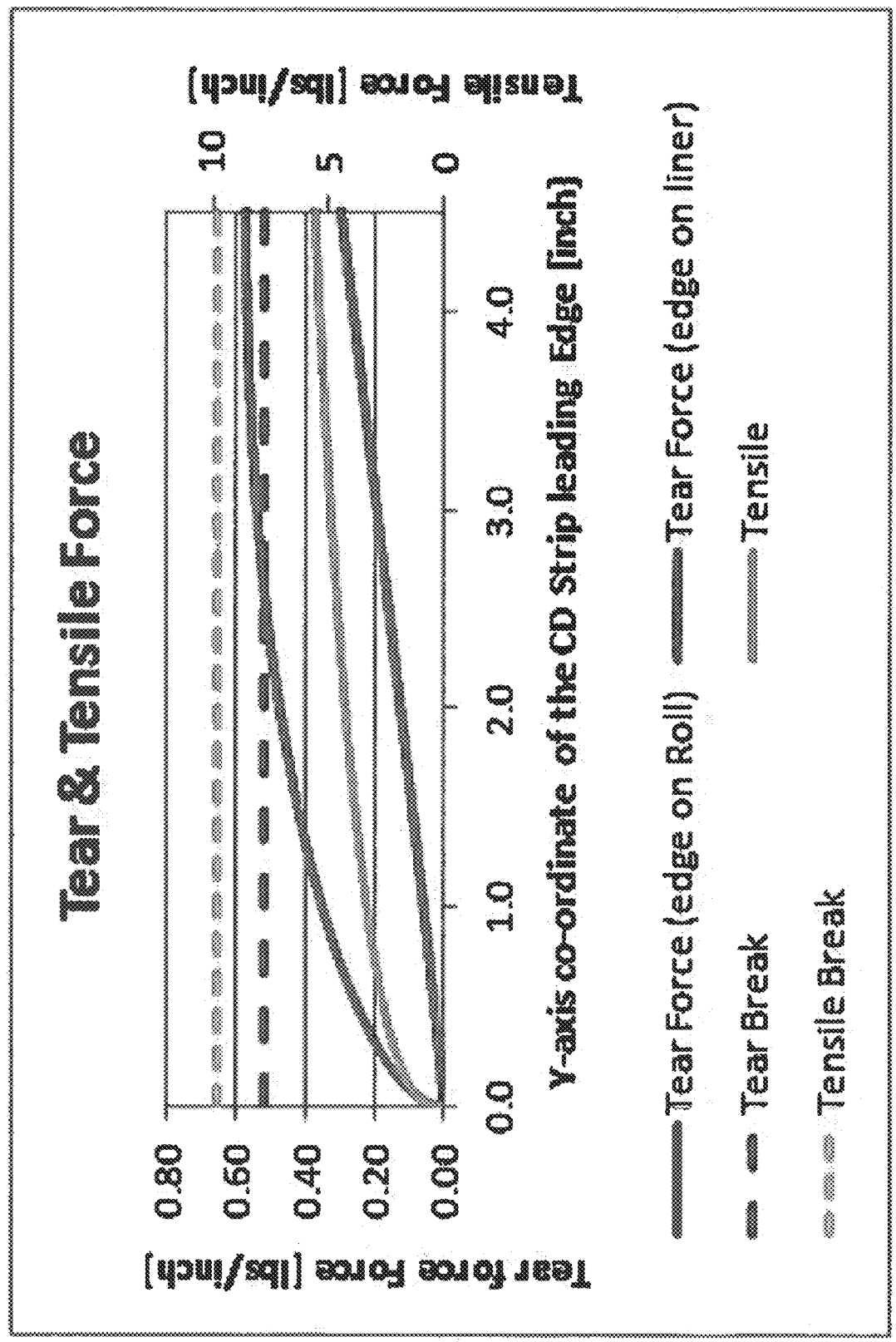
FIG. 7 is a graph showing the tensile and tear forces (lbs./inch) acting on the cross direction of a matrix strip as it is being removed from a converting press at 600 ft/min.

For example, FIG. 7 shows the tensile and tear forces acting on the cross direction matrix strip as it is being removed on a converting press at 600 ft/min. As shown in the graph, at around 2" cross direction position, the tear forces on the cross direction matrix are approximately equal to the tear strength of the facestock, while the tensile force on the facestock is still around 50% lower than cross direction tensile strength of the facestock.

In papermaking processes, paper tensile strength can be increased in many ways. In one approach the tensile strength can be increased by increasing the refining, though this leads to reduction in tear strength. An alternative way is to increase the amount of fiber in the paper. Most facestock paper manufacturers focus mostly on the tensile strength and ignore tear strength. Therefore, even if a lower basis weight product with the appropriately balanced tensile and tear strength will work for the desired application, the industry ends up using a higher basis weight product to meet the converting performance requirement.

In some embodiments, the label assemblies described herein can be manufactured with thinner facestock grades that will have the balanced tensile and tear properties, so that the final product can meet converting needs.

In some embodiments, the desired balance between the tensile and tear strength can be achieved by (1) varying the level of refining of the fibers; (2) choosing the appropriate ratio of fibers (e.g. controlling the ratio of hardwood and softwood fiber); (3) choosing the appropriate type of fiber for hardwood (e.g., aspen, birch, beech, eucalyptus, etc.) and softwood (e.g., spruce, pine, fir, larch, etc.); (4) balance of strength additives (e.g., starch) and refining; (5) increasing the amount of fiber—but it may prevent making lighter/thinner facestocks; (6) reducing the amount of filler; and/or (7) applying strength generating additives on the backside of the facestock. Generally, increasing refining increases tensile strength but decreases tear strength. There is a fine balance to what level one needs to refine. Similarly, there are only certain amounts of strength additives (e.g., starch) that can be added, beyond which no additional amount of the additive is retained in the paper (due to the charge density limitations). Furthermore, there is a fine balance to what type and amount of fibers can be mixed to achieve the optimal balance between tensile and tear strength, without causing formation issues with the paper. The desired balance of properties will shift for different product lines, as different product lines use different label shapes and different label shapes may require a different balance of tensile and tear strength. Therefore, the numerical ranges for tensile and tear strength will vary for different product lines.

In some embodiments, the facestock contains one or more of a paper (optionally coated), a foam, a polymer film, a metalized plastic film (which may be opaque, transparent, or translucent), a metalized paper, a paper backed foil, a metal foil, a woven fabric, and a non-woven fabric. When the facestock contains paper, the paper may be recycled paper. Optionally, the facestock layer is printed.

A topcoat and/or a protective layer may be applied to the side of the facestock opposite the adhesive. The protective layer may protect indicia printed on the facestock. The topcoat layer may be a print-receptive layer.

D. Release Liner

The release liner is an optional component in the label assemblies described herein. In other words, the label assemblies may be linerless. Modifications to the facestock and/or adhesive layer and/or the inclusion of the reinforcement layer may provide sufficient strength and stiffness such that the liner can be omitted.

When present, the release liner may include polyolefin (e.g., polyethylene) coated papers with a commercial silicone release coating, polyolefin (e.g., polyethylene) coated polyester (e.g., polyethylene terephthalate) films with a commercial silicone release coating, or cast polyolefin (e.g., polypropylene) films that can be embossed with a pattern or patterns while making such films, and thereafter coated with a commercial silicone release coating.

Eliminating the liner, reducing the amount of the facestock material, and/or reducing the amount of adhesive may provide cost savings and/or improved sustainability. Removal of liners from label assemblies may typically be associated with increased need for stiffness and strength. It may be beneficial to increase the stiffness and strength of the label print layer in linerless embodiments. The modifications to the facestock and/or adhesive layers and/or the inclusion of the reinforcement layer may provide stiffness and strength increases for the label print layer. Facestock tear strength may be measured using the TAPPI tear strength method (T414).

The following example is provided to illustrate the devices and methods of the present disclosure. The examples are merely illustrative and are not intended to limit the disclosure to the materials, conditions, or process parameters set forth therein.

EXAMPLES

A drawdown lab study was conducted by coating the backside of a developmental facestock (Facestock #1) with about 9 gsm SELVOL™ 09-325. Coated and uncoated Facestock #1 samples were tested for cross direction tensile strength and machine direction tear strength. SELVOL™ 09-325 is a polyvinyl alcohol solution manufactured from vinyl acetate monomer via a multistep process. In the production of SELVOL™ 09-325, vinyl acetate monomer is polymerized into polyvinyl acetate and then converted to polyvinyl alcohol.

Figure 8:
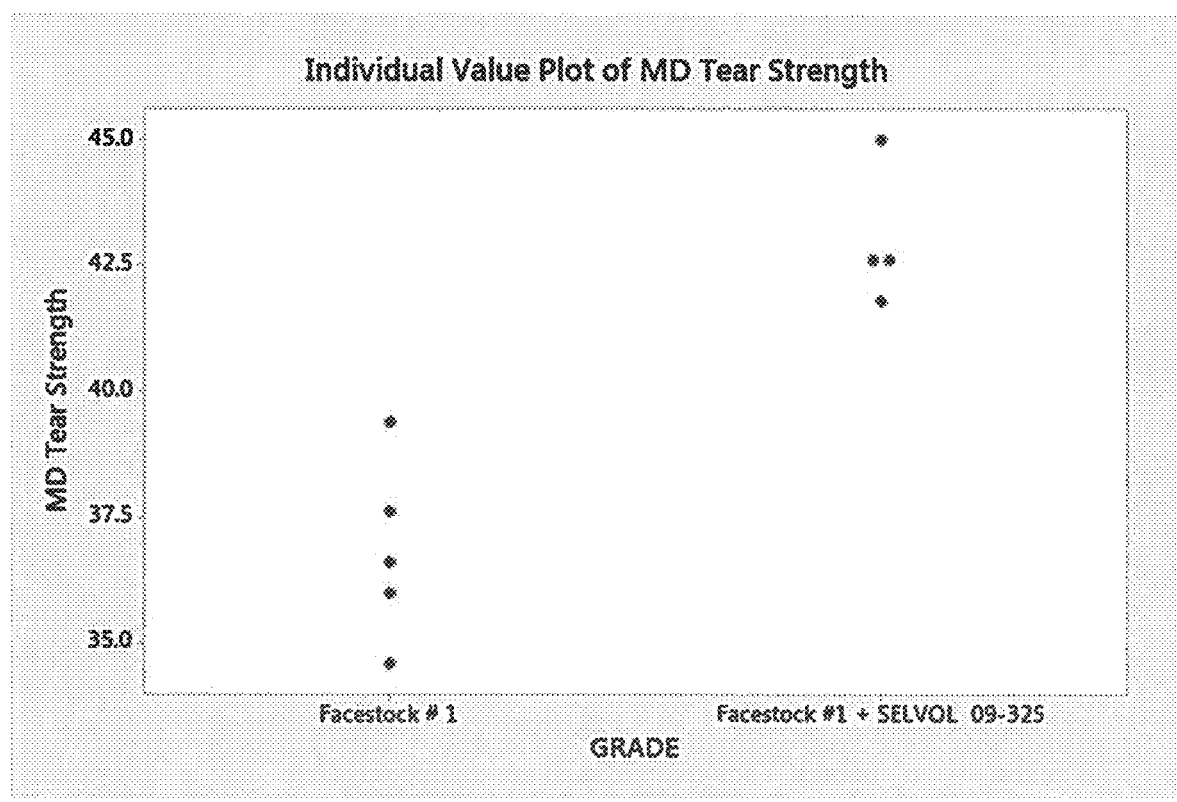
FIG. 8 is an individual value plot comparing the MD tear strength of a facestock (Facestock #1) compared to a reinforced facestock (Facestock #1+09-325).

FIG. 8 is an individual value plot comparing the MD tear strength of the uncoated Facestock #1 and the Facestock #1 reinforced with SELVOL™ 09-325.

Figure 9:
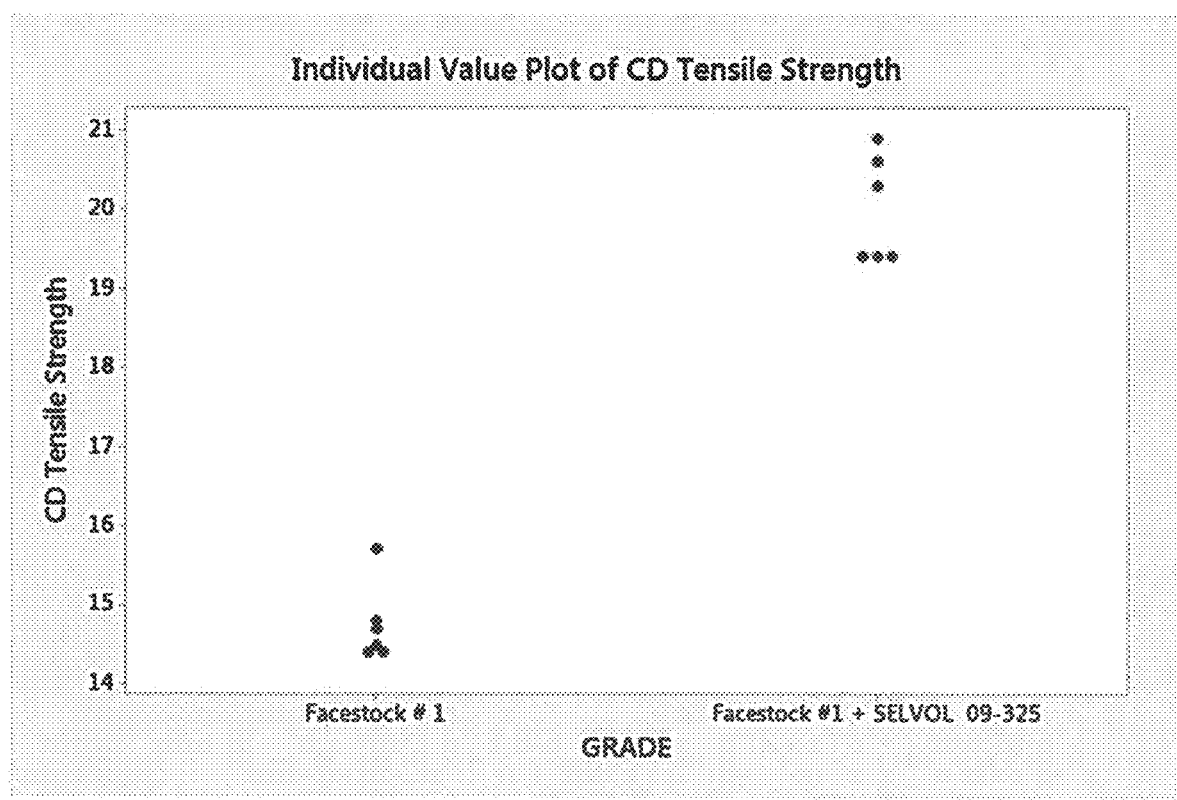
FIG. 9 is an individual value plot comparing the CD tensile strength data for a facestock (Facestock #1) and a reinforced facestock (Facestock #1+09-325).

FIG. 9 is an individual value plot comparing the CD tensile strength of the Facestock #1 and the Facestock #1 reinforced with SELVOL™ 09-325.

Table 1 below summarizes the cross direction tensile strength and machine direction tear strength lab data for the Facestock #1 and about 9 gsm SELVOL™ 09-325 drawdown on the backside of the Facestock #1.

TABLE 1

CD Tensile Strengths and MD Tear Strengths for Unreinforced and Reinforced Label Assemblies

| GRADE | CD Tensile Strength | MD Tear Strength |
| --- | --- | --- |
| Facestock #1 | 14.7 | 37.6 |
| Facestock #1 | 14.4 | 36.0 |
| Facestock #1 | 14.4 | 36.6 |
| Facestock #1 | 14.5 | 39.4 |
| Facestock #1 | 15.7 | 34.6 |
| Facestock #1 | 14.8 | |
| Facestock #1 + SELVOL ™ 09-325 | 20.9 | 41.8 |
| Facestock #1 + SELVOL ™ 09-325 | 19.4 | 42.6 |
| Facestock #1 + SELVOL ™ 09-325 | 20.3 | 42.6 |
| Facestock #1 + SELVOL ™ 09-325 | 19.4 | 45.0 |
| Facestock #1 + SELVOL ™ 09-325 | 20.6 | |
| Facestock #1 + SELVOL ™ 09-325 | 19.4 | |

These results show a significant increase in cross direction tensile strength (36%) and tear strength (17%). Based on simulation modeling, maximum converting speed depends on both cross direction tensile strength and machine direction tear-strength. It is believed that by reinforcing the facestock with SELVOL™ 09-325, converting speed can be improved.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A label assembly comprising:
   a facestock with a basis weight between 12 and 80 pounds per 3300 ft² ream;
   an adhesive layer; and
   a reinforcement layer located between the facestock layer and the adhesive layer, wherein the reinforcement layer comprises a mixture of polyamidoamine-epichlorohydrin and polyvinyl alcohol coated at 9 grams per square meter (gsm) onto the facestock.

2. The label assembly of claim 1, wherein the adhesive layer comprises at least one adhesive selected from the group consisting of a hot melt adhesive, an emulsion adhesive, a solvent adhesive, and combinations thereof.

3. The label assembly of claim 1, wherein the label assembly does not comprise a release liner.

4. The label assembly of claim 1, wherein the label assembly comprises a release liner.

5. The label assembly of claim 1, wherein the reinforcement layer is continuous.

6. The label assembly of claim 1, wherein the reinforcement layer comprises a plurality of gaps and wherein the adhesive layer extends through the gaps to the facestock layer.

7. The label assembly of claim 1, wherein the reinforcement layer comprises a plurality of rows and wherein the rows are parallel to a machine direction of the label assembly.

8. The label assembly of claim 1, wherein the reinforcement layer comprises a grid and a plurality of openings extending through the reinforcement layer.

9. A label assembly comprising:
   a facestock layer with a basis weight between 12 and 80 pounds per 3300 ft² ream; and
   an adhesive layer comprising an adhesive material and a reinforcing material, wherein the reinforcement material comprises a mixture of polyamidoamine-epichlorohydrin and polyvinyl alcohol coated at about 9 gsm onto the facestock.

10. The label assembly of claim 9, wherein the label assembly does not comprise a release liner.

11. The label assembly of claim 9, wherein the label assembly comprises a release liner.

12. A method for forming a label assembly comprising:
    applying a reinforcement layer at 9 grams per square meter (gsm) to a facestock layer with a basis weight between 12 and 80 pounds per 3300 ft² ream; wherein the reinforcement layer comprises a mixture of polyamidoamide-epichlorohydrin and polyvinyl alcohol; and
    applying an adhesive layer to the reinforcement layer.

13. The method of claim 12, further comprising applying a release liner to the adhesive layer.

14. The method of claim 12, wherein the application of the reinforcement layer to the facestock layer includes pattern coating a reinforcement material onto a first surface of the facestock layer; wherein the reinforcement layer covers less than 100% of the first surface.

15. The method of claim 14, wherein the reinforcement layer comprises a plurality of openings; and wherein the application of the adhesive layer to the reinforcement layer comprises depositing an adhesive composition on the reinforcement layer; and wherein the adhesive composition at least partially fills the plurality of openings.

16. The method of claim 12, wherein the reinforcement layer is applied using a dual die, a slide die, or a three-layer die.

17. The method of claim 16, wherein the reinforcement layer is applied using the three layer die with the reinforcement layer as a middle layer.

18. The method of claim 12, wherein the reinforcement layer is applied directly to the facestock layer.

19. A method for forming a label assembly comprising:
    applying a reinforcement layer at 9 grams per square meter (gsm) to a first surface of an adhesive layer,
    the adhesive layer further comprising a second surface in contact with a label liner layer; and
    contacting the applied reinforcement layer with a facestock layer with a basis weight between 12 and 80 pounds per 3300 ft² ream wherein the reinforcement layer comprises a mixture of polyamidoamide-epichlorohydrin and polyvinyl alcohol.

* * * * *